(12) United States Patent
Wolentarski et al.

(10) Patent No.: US 10,090,578 B2
(45) Date of Patent: Oct. 2, 2018

(54) RADIATION-REDIRECTING EXTERNAL CASE FOR PORTABLE COMMUNICATION DEVICE

(71) Applicant: Antenna79, Inc., Encinitas, CA (US)

(72) Inventors: Kevin Wolentarski, Encinitas, CA (US); Nikhil Nilakantan, Encinitas, CA (US); Karl Shields, Encinitas, CA (US); Mike Farese, Encinitas, CA (US); Ryan McCaughey, Encinitas, CA (US); Justin Adams, Encinitas, CA (US)

(73) Assignee: Penumbra Brands, LLC, North Salt Lake, UT (US)

( * ) Notice: Subject to any disclaimer, the term of this patent is extended or adjusted under 35 U.S.C. 154(b) by 82 days.

(21) Appl. No.: 14/826,787

(22) Filed: Aug. 14, 2015

(65) Prior Publication Data

US 2017/0047635 A1 Feb. 16, 2017

(51) Int. Cl.
*H01Q 1/24* (2006.01)
*H04B 1/3827* (2015.01)

(52) U.S. Cl.
CPC ............ *H01Q 1/243* (2013.01); *H01Q 1/245* (2013.01); *H04B 1/3838* (2013.01)

(58) Field of Classification Search
CPC ......... H01Q 1/243; H01Q 1/244; H01Q 1/245
USPC .................................. 343/702, 833, 834, 841
See application file for complete search history.

(56) References Cited

U.S. PATENT DOCUMENTS

| | | | | |
|---|---|---|---|---|
| 4,992,799 A | * | 2/1991 | Garay | H01Q 7/00 343/700 MS |
| 7,079,079 B2 | * | 7/2006 | Jo | H01Q 1/243 343/700 MS |
| 8,154,460 B2 | * | 4/2012 | Sakata | H01Q 1/243 343/702 |
| 8,442,602 B2 | | 5/2013 | Wong et al. | |
| 8,954,122 B2 | | 2/2015 | Wilmhoff et al. | |
| 2013/0009829 A1 | * | 1/2013 | Kurihara | H01Q 1/243 343/702 |
| 2015/0011273 A1 | * | 1/2015 | Wilmhoff | H01Q 1/245 455/575.7 |

* cited by examiner

*Primary Examiner* — Dameon E Levi
*Assistant Examiner* — Hasan Islam
(74) *Attorney, Agent, or Firm* — Holland & Hart LLP

(57) ABSTRACT

An external case is configured to attach to a wireless device that has an antenna and a case separate from the external case. The external case has a first case portion and a second case portion. The second case portion is moveably attached to the first case portion and is moveable between a first position corresponding to the external case being closed and a second position corresponding to the external case being open. Additionally, the second case portion has an antenna system. The antenna system is parasitically coupled to the antenna of the wireless device. The antenna system receives from and sends to free space when the wireless device is operational, when the external case is attached to the wireless device, and when the second case portion is in the first position and in the second position.

22 Claims, 18 Drawing Sheets

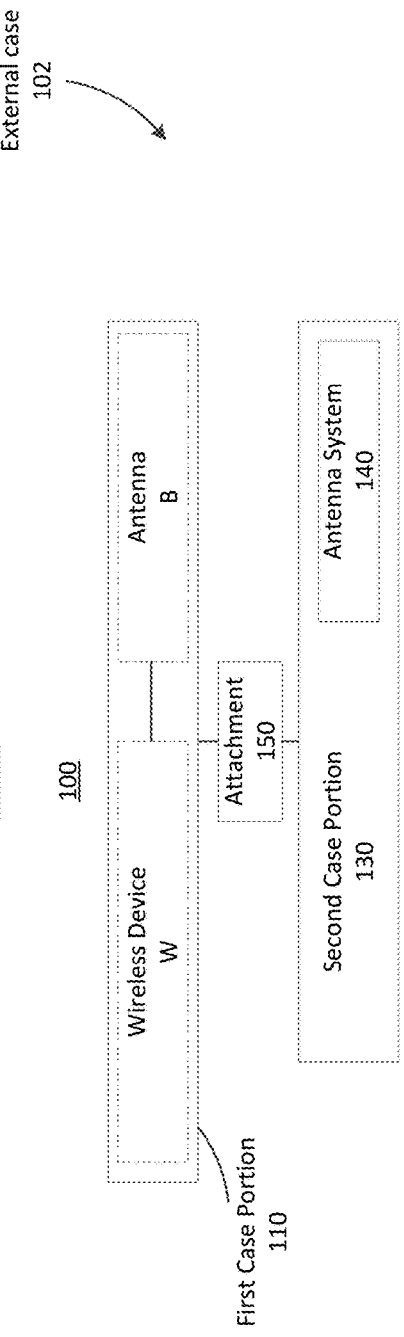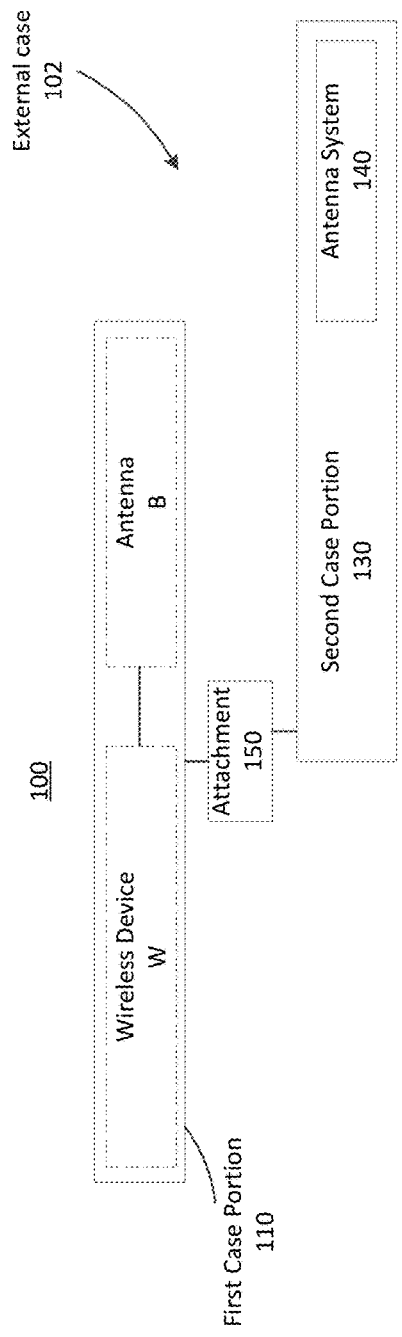

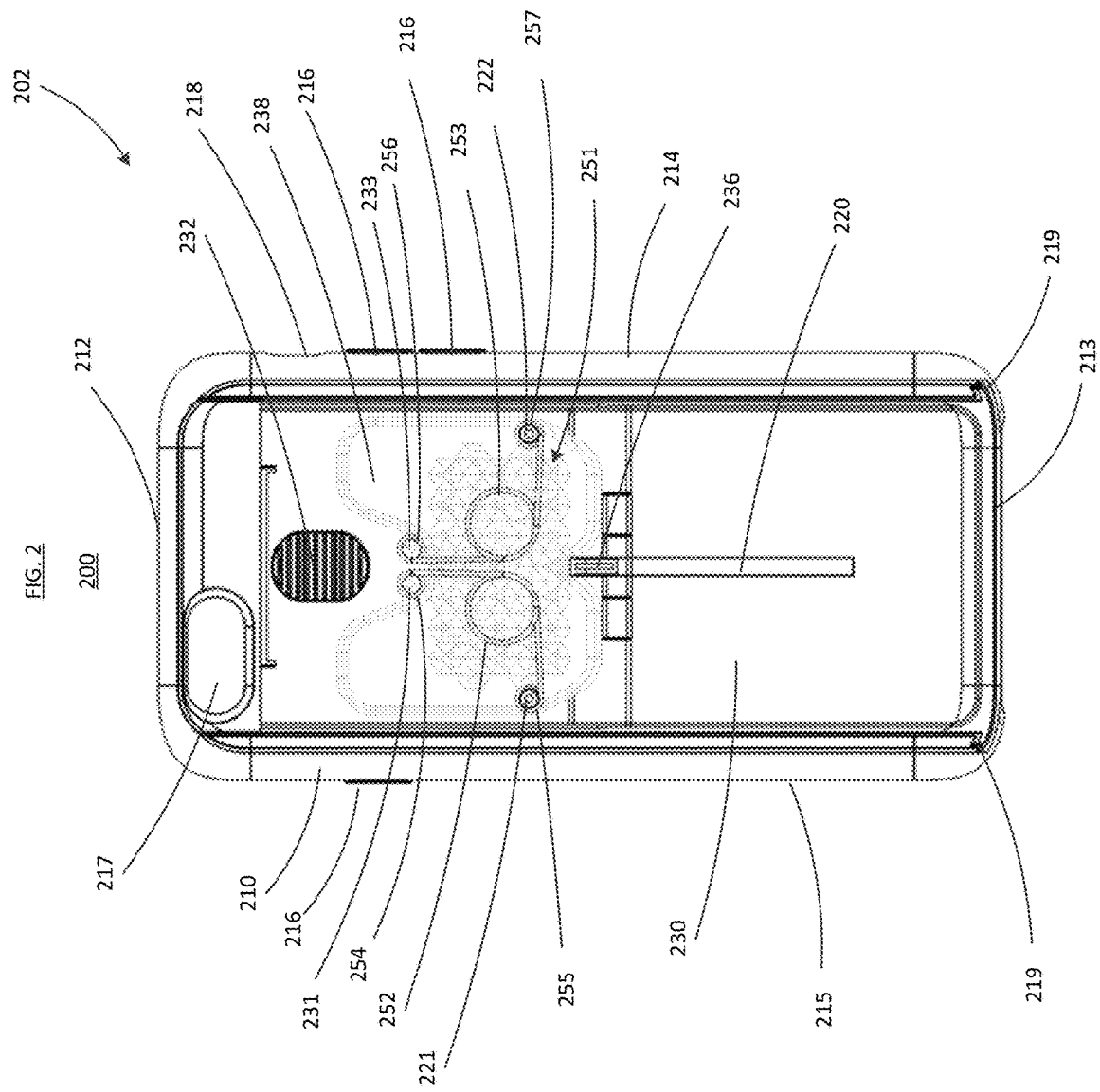

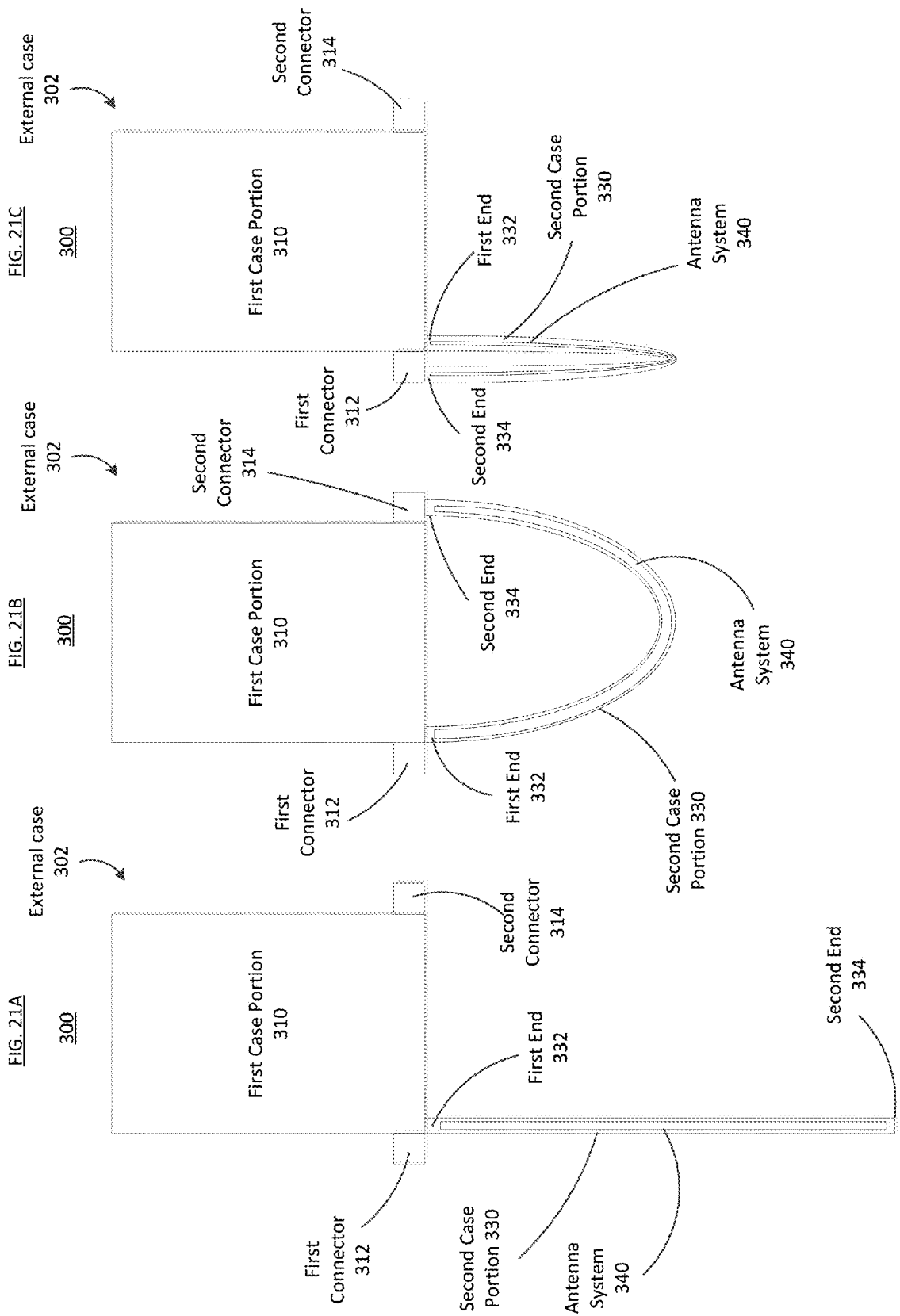

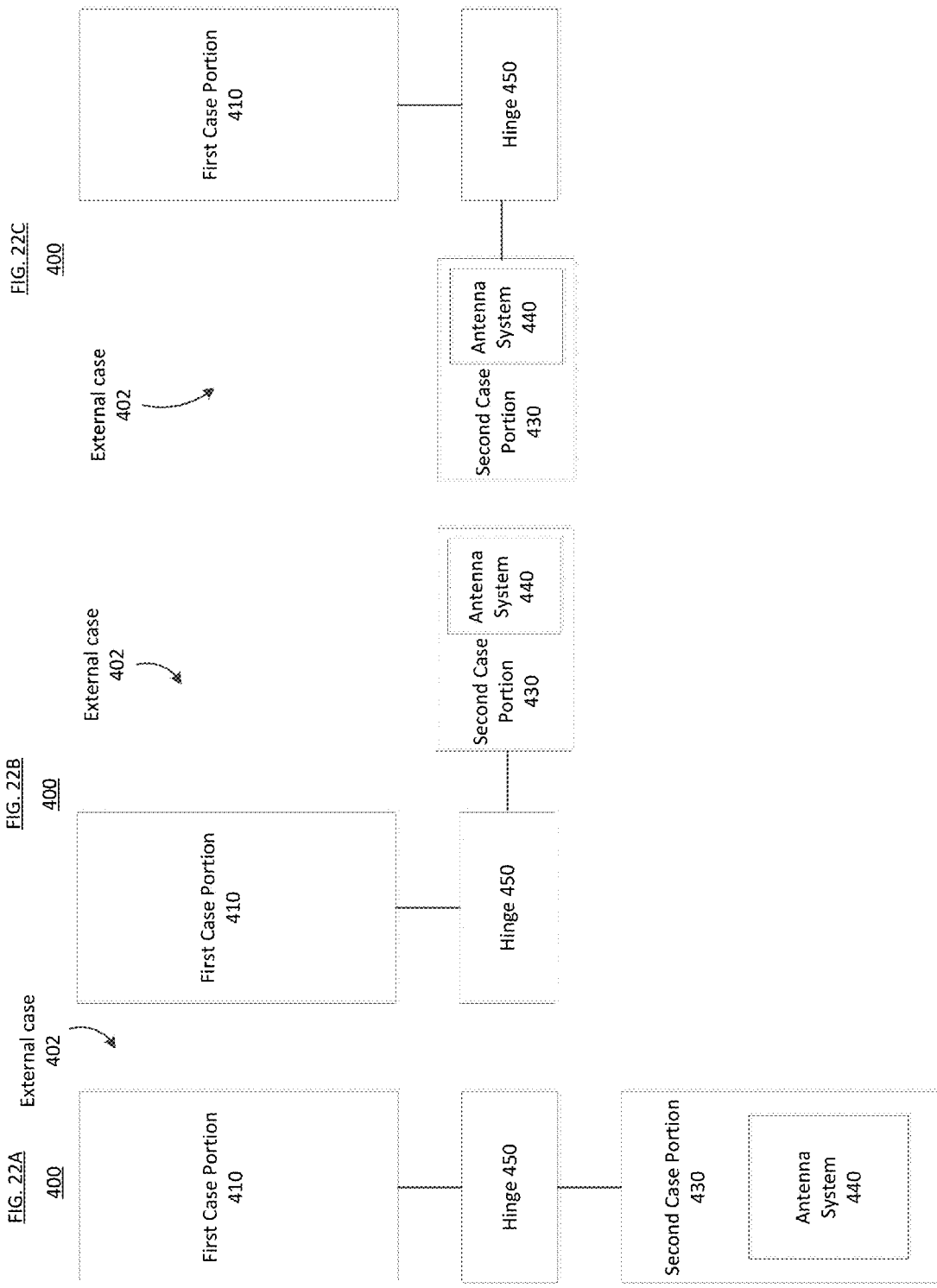

RADIATION-REDIRECTING EXTERNAL CASE FOR PORTABLE COMMUNICATION DEVICE

BACKGROUND

Embodiments described herein relate generally to radiation-redirecting external cases for mobile communication devices such as cell phones, smartphones and similar handheld devices.

Design requirements of mobile communication devices place an increasing premium on the available antenna space within these devices as their functions become more diverse, ranging from the original basic function as a wireless telephone to a music player, video player, handheld computer, wireless internet device for browsing the web, retrieving email and downloading or uploading files, a still camera, a video camera, a GPS device, a navigation system, etc. Some of these functions involve transmission and reception of wireless signals including voice information, data signals, and/or navigation information. Voice and data signals can include, for example, 2G, 3G, and/or 4G signals. The signals can also include WiFi® signals, Bluetooth® signals, or global positioning satellite (GPS) data. As more spectrum is made available to cope with the demands of data transmission, antennas are frequently multi-band or broadband in frequency—all of which can compromise antenna efficiency.

In addition, radio frequency (RF) radiation from mobile phones is becoming of greater concern as a health risk. Partially for safety reasons, the FCC requires limiting the radiation from a mobile communication device (such as a mobile or cellular telephone) that is directed towards a user's head (Specific Absorption Rate, or SAR). As wireless communication technology advances, however, the mobile communication device has increasing data-intensive functions, involving high rates of data transfer between the cell phone and the base station tower. Because increasing the power output of the antenna is typically difficult without increasing the SAR, and because limited space exists on board the wireless communication devices to include components reducing RF radiation in the direction of the user while improving RF signal, a need exists for an external device that includes an improved antenna system for redirecting RF radiation from a user's body and/or strengthening antenna signal in both the transmission and reception of signals. An external antenna system can also be used to improve the device antenna efficiency at frequencies of interest.

For a more "premium" aesthetic, mobile devices can be made with a metal chassis—an architecture in which the chassis itself functions as (or be part of) the antenna structure. As a result, changing the environment of the chassis (e.g., held in the human hand, or enveloped in a plastic case) can adversely affect antenna efficiency. This outcome can be mitigated to some degree with internal active tuning components—but such hardware adds to the complexity, space requirements and cost of the device.

SUMMARY

Systems, apparatus, and methods related to redirecting RF radiation and improving antenna signal strength or efficiency are described herein. In some embodiments, an apparatus includes an external case. The external case is configured to attach to a wireless device that has an antenna and a case separate from the external case. The external case has a first case portion and a second case portion. The second case portion is moveably attached to the first case portion and is moveable between a first position corresponding to the external case being closed and a second position corresponding to the external case being open. Additionally, the second case portion has an antenna system. The antenna system is parasitically coupled to the antenna of the wireless device. The antenna system receives from and sends to free space when the wireless device is operational, when the external case is attached to the wireless device, and when the second case portion is in the first position and in the second position.

BRIEF DESCRIPTION OF THE DRAWINGS

FIG. 1A is a schematic illustration of a mobile communication device within an external case according to an embodiment in a closed configuration.

FIG. 1B is a schematic illustration of the mobile communication device within an external case of FIG. 1A in an open configuration.

FIG. 2 is a rear view of an external case in a closed configuration with a transparent back cover to show the internal components (minus the coupling antenna system) according to an embodiment.

FIGS. 21A-21C are schematic illustrations of a system according to an embodiment.

FIGS. 22A-22C are schematic illustrations of a system according to an embodiment.

DETAILED DESCRIPTION

Figure 3:
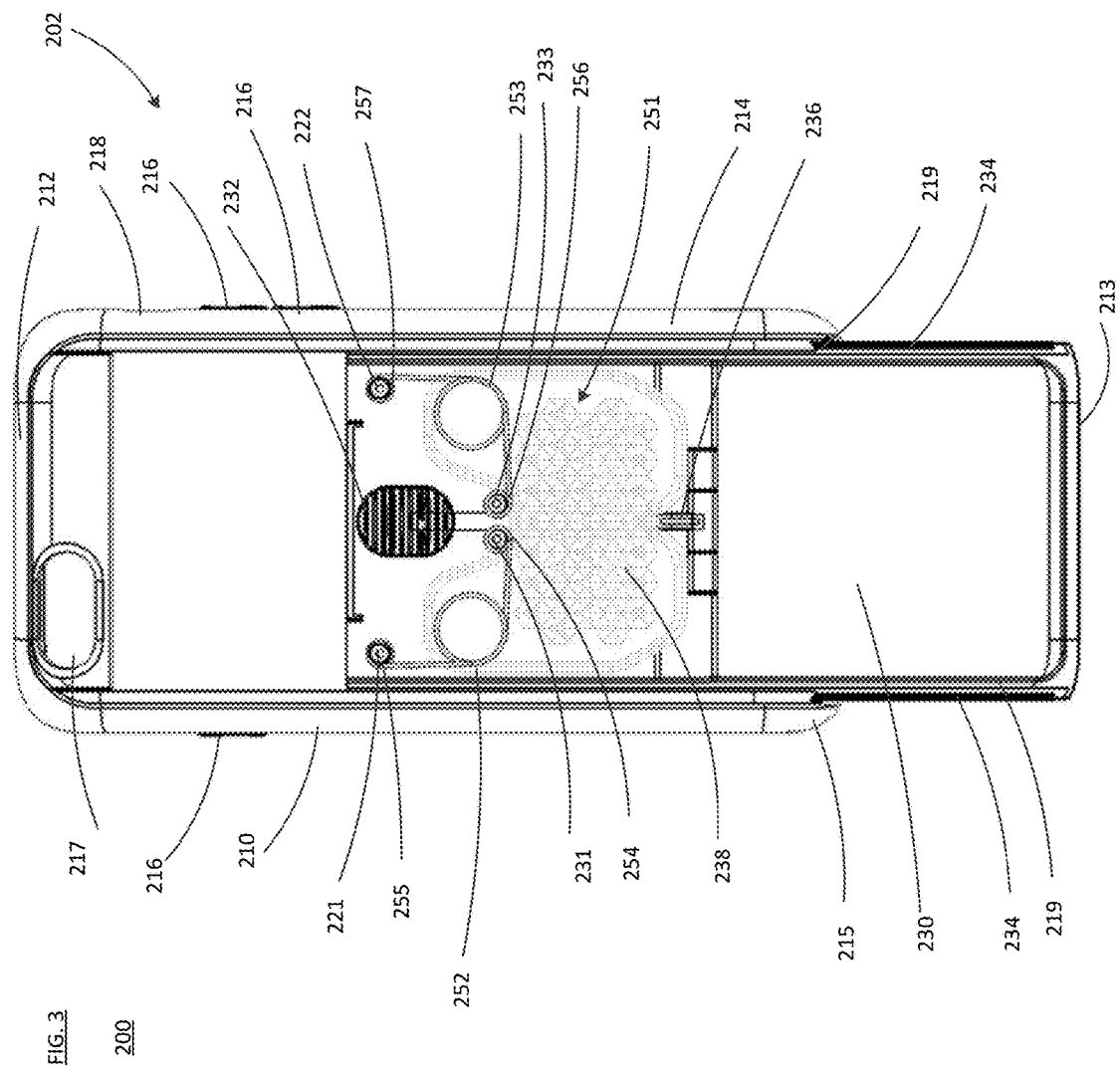
FIG. 3 is a rear view of the external case of FIG. 2 in an open configuration.

The embodiments described herein relate to systems and devices for redirecting RF radiation and improving antenna signal strength.

In some embodiments an apparatus includes an external case. The external case is configured to attach to a wireless device that has an antenna and a case separate from the external case. The external case has a first case portion and a second case portion. The second case portion is moveably attached to the first case portion and is moveable between a first position corresponding to the external case being closed and a second position corresponding to the external case being open. Additionally, the second case portion has an antenna system. The antenna system is parasitically coupled to the antenna of the wireless device. The antenna system receives from and sends to free space when the wireless device is operational, when the external case is attached to the wireless device, and when the second case portion is in the first position and in the second position.

In some embodiments an apparatus includes an external case. The external case is configured to be attached to a wireless device that has an antenna and a case separate from the external case. The external case includes a first case portion and a second case portion moveably attached to the first case portion. The second case portion is moveable between a first position corresponding to the external case being closed and a second position corresponding to the external case being open. The second case portion includes a passive antenna element and is devoid of an active connection to the antenna of the wireless device. The passive antenna element of the second case portion is parasitically coupled to the antenna of the wireless device when the external case is attached to the wireless device, when the wireless device is operational, and when the second case portion is in the first position. The passive antenna system of the second case portion is parasitically coupled to the antenna of the wireless device when the external case is attached to the wireless device, when the wireless device is operational, and when the second case portion is in the second position.

In some embodiments, an apparatus includes an external case. The external case is configured to be coupled to a wireless device that has an antenna and a case separate from the external case. The external case includes a first case portion and a second case portion moveably coupled to the first case portion. The second case portion is moveable between a first position and a second position. The second case portion includes a passive antenna element. The passive antenna element of the second case portion is disposed a first distance from the antenna of the wireless device when the second case portion is in the first position, and is disposed a second distance from the antenna of the wireless device different from the first distance when the second case portion is in the second position. The passive antenna system of the second case portion is parasitically coupled to the antenna of the wireless device when the external case is coupled to the wireless device and when the wireless device is operational.

As used herein, the singular forms "a," "an", and "the" include plural referents unless the context clearly dictates otherwise. Thus, for example, the term "a member" is intended to mean a single member or a combination of members; "a material" is intended to mean one or more materials, or a combination thereof.

FIG. 1A is a schematic illustration of an apparatus 100 according to an embodiment. The apparatus 100 includes an external case 102. The external case 102 includes a first case portion 110 and a second case portion 130. The second case portion 130 is movably attached to the first case portion 110 by an attachment 150. The second case portion 130 includes an antenna system 140.

The external case 102 is configured to attach to a wireless device W. The wireless device W can have an antenna B and a case (not shown) separate from the external case 102. The antenna B can be, for example, an internal antenna (internal to a housing), an external antenna (external to a housing), and/or a radiating chassis (the housing itself). The external case 102 can be configured to attach to the wireless device W in any suitable manner. For example, the first case portion 110 can include a back surface (not shown) and four side surfaces (not shown) to collectively define an interior volume. At least a portion of the wireless device W can be removeably disposed within the interior volume when the wireless device W is attached to the external case 102. The external case 102 can be shaped, sized, and/or configured to meet the requirements of any type and/or model of wireless device W.

The second case portion 130 is movable relative to the first case portion 110 between a first position, as shown in the configuration of FIG. 1A, and a second position, as shown in the configuration of FIG. 1B. The first position corresponds to the external case 102 being closed, and the second position corresponds to the external case 102 being open. The movement of the second case portion 130 relative to the first case portion 110 also causes a movement of the antenna system 140 relative to the antenna B of the wireless device W. The apparatus 100 is configured so that the antenna system 140 is operative when in either the first position or the second position. The antenna system 140 is also configured to be operative while transitioning from the first position to the second position. Said another way, the antenna system 140 is configured to operate when the apparatus 100 is in any position, and the apparatus is attached to a wireless device W that is operational. The wireless device W can be operational during a call and/or while sending/receiving any other type of signals, such as during data reception or using a Bluetooth® connection. Such signals can be sent/received when a call is not occurring (e.g., control signals, registration signals, hand-off signals, etc.).

The antenna system 140 can be disposed a first distance from the antenna B of the wireless device W when the second case portion 130 is in the first position. The antenna system 140 can be disposed a second distance from the antenna B of the wireless device W, the second distance being different from the first distance, when the second case portion 130 is in the second position. Similarly, the antenna system 140 can be disposed at a first location relative to the antenna B of the wireless device W when the second case portion 130 is in the first position. The antenna system 140 can be disposed at a second location relative to the antenna B of the wireless device W, the second location being different from the first location, when the second case portion 130 is in the second position. The distance that the antenna system 140 is moved relative to the first case portion 110 can depend on any number of factors, including the type of antenna included in the antenna system 140, size, location and type of antenna B, the type of wireless device and ergonomics of handheld use.

The second case portion 130 can have any suitable shape. For example, the second case portion 130 can be shaped as a rectangular plate that can slide or rotate relative to the first case portion 110. In other embodiments, the second case portion 130 can have a first shape in a first position relative to the first case portion 110. The second case portion 130 can then be moved into a second shape in a second position relative to the first case portion 110, the second shape being different from the first shape.

The attachment 150 can be a slide mechanism so that the second case portion 130 is slidably attached to the first case portion 110. In other embodiments, the attachment 150 can be any suitable movable attachment mechanism, such as a rotational attachment, a foldable attachment, or hinged attachment.

The antenna system 140 is configured to be parasitically coupled to the antenna B of the wireless device W. When the external case 102 is attached to the wireless device W and the wireless device W is operational, the antenna system 140 is configured to receive from and send to free space. The antenna system 140 is configured to receive from and send to free space when the second case portion 130 is in the first position, shown in FIG. 1A, and in the second position, shown in FIG. 1B. The antenna system 140 can be configured to redirect radiation to free space and away from a user of the wireless device W, such that a specific absorption rate (SAR) of the wireless device W is reduced without substantially adversely affecting a total radiated power (TRP) of the wireless device W.

In another embodiment the antenna system 140 can be configured to improve the TRP and total isotropic sensitivity (TIS), or transmit and receive efficiency, of the antenna B by increasing the effective aperture of antenna B. Extending the second case portion 130 increases the actual length of the apparatus 100.

The antenna system 140 can be a passive antenna configured to optimize the TRP while reducing the SAR. More specifically, the antenna system 140 can be shaped and sized to provide a relatively-optimal performance when the antenna system 140 is in the first position (i.e., closed position) and the second position (i.e., open or extended position). When the apparatus 100 is moved to the second position, the antenna system 140 is moved as the second case portion 130 is moved. Moving the antenna system 140 away from the antenna B moves the RF near-field, which can reduce RF near-field radiation absorbed into the head or body of the user. In other words, by moving the antenna-related "hot spot" away from the user's body, less RF near-field radiation is likely to be absorbed by the user. Said another way, the antenna system 140 can redistribute the RF near-field of the wireless device W when the wireless device W is operational, such that a specific absorption rate (SAR) of the wireless device W is reduced without substantially adversely affecting a total radiated power (TRP) of the wireless device W. For example, the antenna system 140 can redistribute the RF near-field such that the SAR is reduced, but not redistribute the RF near-field so much that the wireless device W reaches an antenna signal strength threshold where the wireless device W boosts power to the antenna B to increase the signal transmission and/or reception strength causing the SAR to increase. In particular, in either the first position or second position, the antenna system 140 can redistribute the near-field enough such that the SAR is reduced, but not so much that the wireless device W boosts power to the antenna B that results in the SAR being higher than if the external case 102 was not attached to the wireless device W.

In some embodiments, the antenna system 140 of the second case portion 130 can be devoid of an active connection to the antenna B of the wireless device W. The second case portion 130 can be devoid of such an active electrical connection to antenna B such as a transmission line, cable, stripline, microstrip, or waveguide. In some embodiments, the antenna system 140 can be disposed entirely within the second case portion 130. Additionally, the antenna system 140 can have any suitable number of elements arranged in any suitable configuration to relatively optimize the antenna efficiency while minimizing the SAR for multiple positions of antenna system 140. The configuration of the antenna system 140 can be configured to be optimized for a specific antenna B within the wireless device W. For example, the antenna system 140 can include a planar conductive loop or patch and/or a series of planar bars. As another example, some smartphones (e.g., iPhone, BlackBerry, etc) have an antenna B located at both the upper and lower parts of the phone and/or in a manner that borders the display area. The antenna system 140 can be configured to complement the antenna structure of that type of smartphone in order to optimize the TRP while minimizing the SAR. Such an antenna system 140 can include an antenna element having a planar structure with a larger portion near the active elements of the antenna B and a portion around at least a portion of the edge of the smartphone.

In the case of at least one common smartphone, the antenna B is located at the bottom of the phone. The case of this smartphone is made of metal and most radiation is emitted from around the rim of the smartphone. When a user is holding this smartphone, the user tends to grip the smartphone around the rim of the smartphone. Using the apparatus 100 in the closed position of FIG. 1A, the radiation can be redistributed to away from the user's hand. In the closed position, the antenna system 140 can relatively maximize the parasitic coupling with the antenna of the smartphone and draw away radiation from the rim of the smartphone. Using the apparatus 100 in the open position of FIG. 1B, the radiation can be redistributed away from the user's hand and head. In the open position, the antenna system 140 can relatively maximize the parasitic coupling with the antenna of the smartphone and draw radiation from the rim of the smartphone, and will likely experience better performance due to the larger effective antenna size.

In some implementations, the antenna system 140 can include an antenna element (not shown). When the external case 102 is attached to the wireless device W and when the wireless device W is operational, the antenna element can be parasitically coupled to the antenna B of the wireless device W. The antenna element can be parasitically coupled to the antenna B both when the second case portion 130 is in the first position, as shown in FIG. 1A, and when the second case portion 130 is in the second position, as shown in FIG. 1B. In some implementations, the antenna element can be, for example, a passive antenna element. The antenna element can be positioned to substantially optimally parasitically couple to the antenna B of the wireless device W when the external case 102 is attached to the wireless device W and when the wireless device W is operational. In other words, the antenna element can be positioned relative to antenna B such that the transmission and/or reception strength of the antenna element is stronger than if the antenna element is positioned in another location relative to antenna B. In some implementations, the antenna element can be positioned relative to antenna B such that transmission and/or reception strength of the antenna element is stronger than a majority of possible positions relative to antenna B. In some implementations, the antenna element can be positioned to substantially optimally parasitically couple to the antenna B in both the first and second position. For example, when the second case portion 130 is in the first position, the antenna element can be positioned relative to antenna B such that the transmission and/or reception strength of the antenna element is stronger than if the antenna element is positioned in another location relative to antenna B. When the second case portion 130 is in the second position, the antenna element can be in a different position than when the second case portion 130 is in the first position, but can still be positioned relative to antenna B such that the transmission and/or reception strength of the antenna element is stronger than if the antenna element is positioned in another location relative to antenna B while the second case portion 130 is in the second position. In some implementations, the antenna element can be positioned relative to antenna B such that transmission and/or reception strength of the antenna element is stronger than a majority of possible positions relative to antenna B when the second case portion 130 is in the first position. When the second case portion 130 is in the second position, the antenna element can be in a different position than when the second case portion 130 is in the first position, but can still be positioned relative to antenna B such that the transmission and/or reception strength of the antenna element is stronger than a majority of possible positions relative to antenna B while the second case portion 130 is in the second position.

Additionally, the antenna element can be dimensioned so that when the wireless device W is operational and when the external case 102 is attached to the wireless device W, receiving from and/or sending to the free space of cell phone frequencies is substantially optimized. In other words, the antenna element can be dimensioned such that the transmission and/or reception strength of the antenna element is stronger than if the antenna element had alternative dimensions. In some implementations, the antenna element can be dimensioned such that transmission and/or reception strength of the antenna element is stronger than a majority of alternative dimensions. In some implementations, the antenna element can be dimensioned to substantially optimize receiving from and/or sending to the free space of cell phone frequencies in both the first position and the second position. In other words, the antenna element can be dimensioned such that the transmission and/or reception strength of the antenna element is stronger than if the antenna element had alternative dimensions in both the first position and the second position. In some implementations, the antenna element can be positioned relative to antenna B such that transmission and/or reception strength of the antenna element is stronger than a majority of alternative dimensions in both the first position and the second position.

In some implementations, the antenna system 140 can include a first antenna element (not shown) and a second antenna element (not shown). In some implementations, the first antenna element can be a first passive antenna element and/or the second antenna element can be a second passive antenna element. When the external case 102 is attached to the wireless device W and when the wireless device W is operational, the first antenna element can be parasitically coupled to the antenna B of the wireless device W. Also when the wireless device W is operational, the first antenna element and the second antenna element can be operatively coupled. Additionally, the second antenna element can receive signals from and send signals to free space when the wireless device W is operational and when the external case 102 is attached to the wireless device W. The second antenna element can be configured to receive signals from and send signals to free space such that a specific absorption rate (SAR) of the wireless device W while the second case portion 130 is in the first position and an SAR of the wireless device W while the second case portion 130 is in the second position are both less than an SAR of the wireless device 130 when the external case 102 is not attached to the wireless device W. Said another way, in both the first position and the second position, the second antenna element can redirect radiation to free space and away from a user of the wireless device W, such that an SAR of the wireless device W is reduced. The second antenna element can redirect radiation in both the first position and second position such that the SAR of the wireless device W is reduced without substantially adversely affecting a total radiated power (TRP) of the wireless device W. For example, the second antenna element can redirect enough radiation in either the first position or second position so that the SAR is reduced, but not so much radiation that the wireless device W reaches an antenna signal strength threshold where the wireless device W boosts power to the antenna B to increase the signal transmission and/or reception strength so that the SAR is increased by the power boost to the antenna B. In particular, in either the first position or second position, the second antenna element can redirect enough radiation so that the SAR is reduced, but not so much radiation that the wireless device W boosts power to the antenna B that results in the SAR being higher than if the external case 102 was not attached to the wireless device W.

In some embodiments, the wireless device W can have a total radiated power (TRP). When the second case portion 130 is in the first position and the wireless device W is operational, a TRP of the wireless device W can be not substantially reduced when the external case 102 is attached to the wireless device W compared to a TRP of the wireless device W when the external case 102 is not attached to the wireless device W. Additionally, a TRP of the wireless device W when the external case 102 is attached to the wireless device W, when the second case portion 130 is in the second position, and when the wireless device W is operational, is not substantially reduced from the TRP of the wireless device W when the external case 102 is not attached to the wireless device W. For example, the antenna system 140 can be configured so that when the second case portion 130 is in either the first position or the second position, the TRP is not reduced to the extent that the wireless device W boosts power to the antenna B in order to increase the signal transmission and/or reception strength of the wireless device W. In particular, in both the first position and second position of the second case portion 130, the antenna system 140 can operate so that the TRP is not reduced to the extent that the wireless device W boosts power to the antenna B that results in the SAR being higher than if the external case 102 was not attached to the wireless device W.

In some implementations, when the second case portion 130 is in the first position and the wireless device W is operational, a TRP of the wireless device W is not substantially reduced when the external case 102 is attached to the wireless device W compared to a TRP of the wireless device W when the external case 102 is not attached to the wireless device W. Additionally, a TRP of the wireless device W when the external case 102 is attached to the wireless device W, when the second case portion 130 is in the second position, and when the wireless device W is operational, is increased from the TRP of the wireless device W when the external case 102 is not attached to the wireless device W.

In some implementations, when the second case portion 130 is in the first position and the wireless device W is operational, a TRP of the wireless device W is increased when the external case 102 is attached to the wireless device W compared to a TRP of the wireless device W when the external case 102 is not attached to the wireless device W. Additionally, a TRP of the wireless device W when the external case 102 is attached to the wireless device W, when the second case portion 130 is in the second position, and when the wireless device W is operational, is increased compared to the TRP of the wireless device W when the second case portion 130 is in the first position.

In some implementations, the wireless device W can have a total isotropic sensitivity (TIS). When the second case portion 130 is in the first position and the wireless device W is operational, a TIS of the wireless device W is not substantially degraded when the external case 102 is attached to the wireless device W compared to a TRP of the wireless device W when the external case 102 is not attached to the wireless device W. Additionally, a TIS of the wireless device W when the external case 102 is attached to the wireless device W, when the second case portion 130 is in the second position, and when the wireless device W is operational, is not substantially degraded from the TRP of the wireless device W when the external case 102 is not attached to the wireless device W. For example, the antenna system 140 can be configured so that when the second case portion 130 is in either the first position or the second position, the TIS is not degraded to the extent that the wireless device W boosts power to the antenna B to increase the signal transmission and/or reception strength of the wireless device W. In particular, in both the first position and second position of the second case portion 130, the antenna system 140 can operate so that the TIS is not degraded to the extent that the wireless device W boosts power to the antenna B that results in the SAR being higher than if the external case 102 was not attached to the wireless device W.

In some embodiments, the wireless device W can have a received signal power. The received signal power can be, for example, a received signal strength indicator (RSSI) or a reference signal received power (RSRP). When the second case portion 130 is in the first position and the wireless device W is operational, a received signal power of the wireless device W is not substantially reduced or degraded when the external case 102 is attached to the wireless device W compared to a received signal power of the wireless device W when the external case 102 is not attached to the wireless device W. Additionally, a received signal power of the wireless device W when the external case 102 is attached to the wireless device W, when the second case portion 130 is in the second position, and when the wireless device W is operational, is not substantially reduced or is improved from the received signal power of the wireless device W when the external case 102 is not attached to the wireless device W. In sum, the attachment of the external case 102 to the wireless device W does not substantially reduce the received signal power of the wireless device W.

FIGS. 2-20 are illustrations of an apparatus 200 according to an embodiment. FIGS. 2 and 3 are rear views of the apparatus 200 in a closed position (FIG. 2) and an open position (FIG. 3) with internal components of a second case portion 230 shown through a transparent case portion 230. The apparatus 200 includes an external case 202. The external case includes a first case portion 210 and the second case portion 230. The second case portion 230 is slidably attached to the first case portion 210. The second case portion 230 includes an antenna system 240 (shown in FIG. 4). The antenna system 240 can include any of the features of the antenna system 140 described with reference to apparatus 100. In this embodiment, the antenna system 240 has a single antenna element and can also be referred to as an antenna element.

Figure 4:
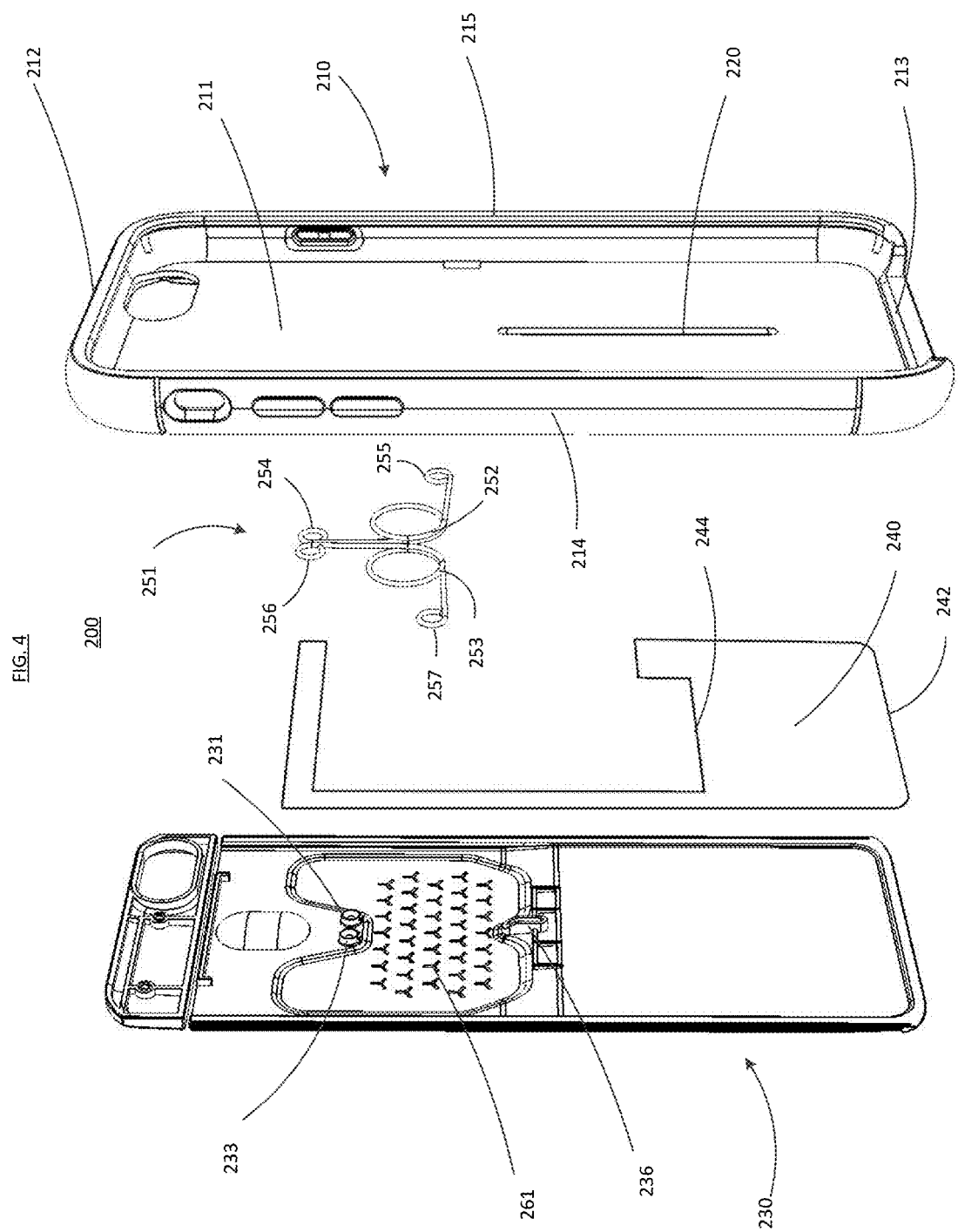
FIG. 4 is an exploded front perspective view of the external case of FIG. 2, including the antenna coupling system.

The first case portion 210 is configured to attach to a wireless device (not shown). The wireless device can have an antenna and a case separate from the external case 202. The external case 202 can be configured to attach to the wireless device in any suitable manner. For example, the first case portion 210 can include an interior surface 211 (shown in FIG. 4) and four side surfaces to collectively define an interior volume (shown in FIG. 4). FIG. 4 shows the apparatus 200 in an exploded perspective from the front left side. The four side surfaces can include a top side surface 212, a bottom side surface 213, a left side surface 214, and a right side surface 215. At least a portion of the wireless device can be removeably disposed within the interior volume when the wireless device is attached to the external case 202. Although shown as having four side surfaces and an interior surface, the external case 202 can be shaped, sized, and/or configured to work with any type and/or model of wireless device.

The second case portion 230 is slidable relative to the first case portion 210 between a first position, as shown in the configuration of FIG. 2, and a second position, as shown in the configuration of FIG. 3. The first position corresponds to the external case 202 being closed and the second position corresponds to the external case 202 being open. The movement of the second case portion 230 relative to the first case portion 210 also causes a movement of the antenna system 240 of the second case portion 230 relative to the antenna of the wireless device. The apparatus 200 is configured so that the antenna system 240 is operative in both the first position and the second position. The antenna system 240 is also configured to be operative while transitioning from the first position to the second position.

The antenna system 240 can be disposed a first distance from an antenna of a wireless device when the second case portion 230 is in the first position. Then, the antenna system 240 can be disposed a second distance from the antenna of the wireless device, the second distance being different from the first distance, when the second case portion 230 is in the second position. Similarly, the antenna system 240 can be disposed at a first location relative to the antenna of the wireless device when the second case portion 230 is in the first position. Then, the antenna system 240 can be disposed at a second location relative to the antenna of the wireless device, the second location being different from the first location, when the second case portion 230 is in the second position. In some implementations, when the second case portion 230 is in the first position, a first edge 242 of the antenna system 240, shown in FIG. 4, is positioned over (or proximate to) and can couple with, for example, a bottom edge of a radiating chassis of a wireless device when the external case 202 is attached to the wireless device and the wireless device is operational. When the second case portion 230 is in the second position, a second edge 244 of the antenna system 240, shown in FIG. 4, is positioned over (or proximate to) and can couple with the bottom edge of the radiating chassis of the wireless device when the external case 202 is attached to the wireless device and the wireless device is operational.

The first case portion 210 can include buttons 216 corresponding to any buttons located on a wireless device. The buttons 216 allow for the wireless device to be functionally operated through the external case 202 when the external case 202 is attached to the wireless device. The first case portion 210 and/or the second case portion 230 can define any suitable number, size, and location of openings for the functionalities of the wireless device to be accessible when the external case 202 is attached to the wireless device. For example, the first case portion 210 and/or the second case portion 230 can define one or more camera openings 217 for a camera integrated into the wireless device to be operated when the external case 202 is attached to the wireless device. As another example, the first case portion 210 and/or the second case portion 230 can define one or more switch openings 218 for one or more switches on the wireless device to be accessible when the external case 202 is attached to the wireless device. The second case portion 230 can include a texturized thumb grip 232 to aid the user in transitioning the second case portion 230 from the first position, shown in FIG. 2, to the second position, shown in FIG. 3.

Figure 5:
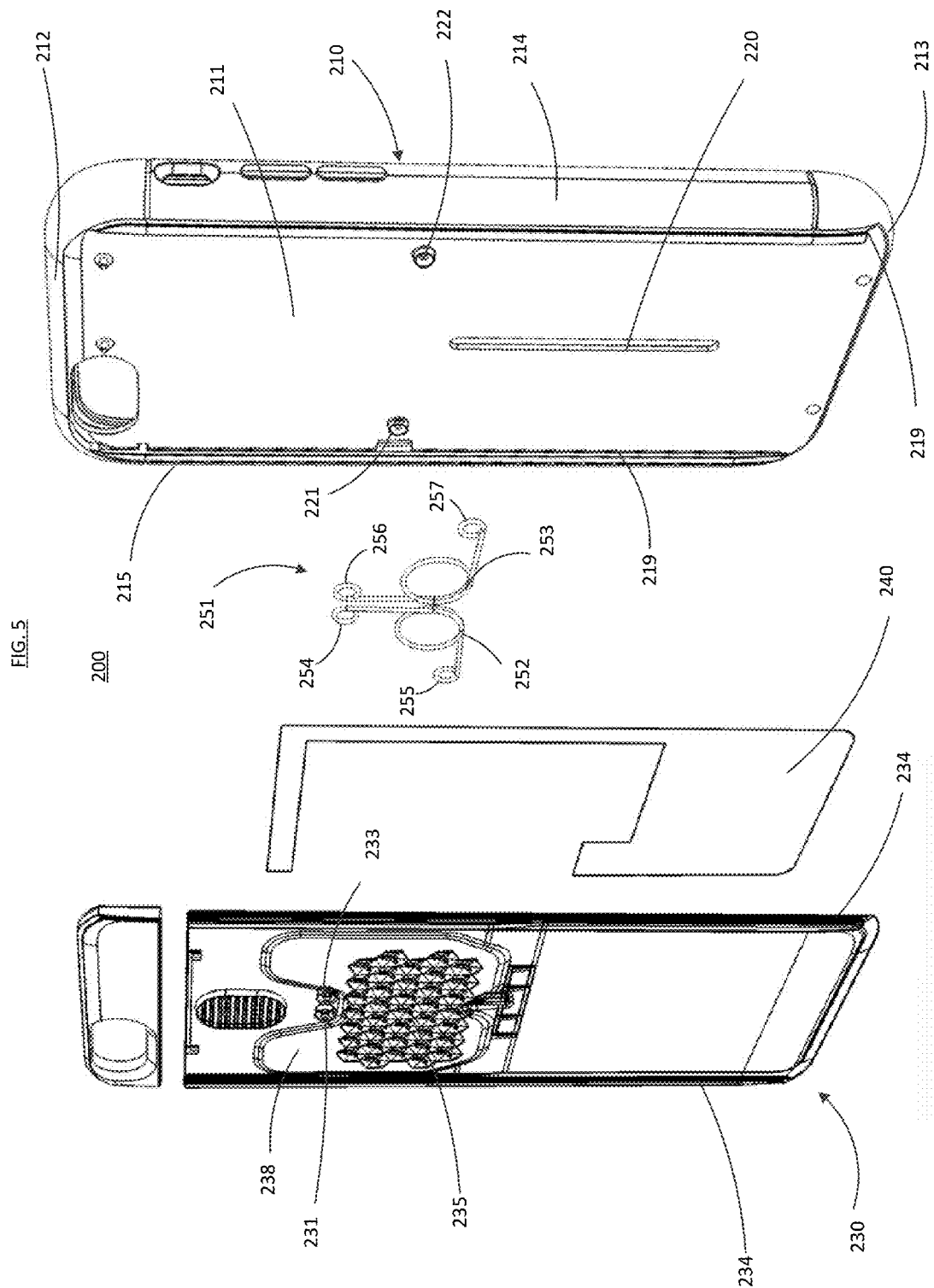
FIG. 5 is an exploded back perspective view of the external case of FIG. 2 with a transparent back exterior face.

FIG. 5 shows the apparatus 200 in an exploded perspective from the back left side with the second case portion 230 having a transparent back exterior face. As shown in FIG. 5, for the second case portion 230 to be slidable relative to the first case portion 210 between the first position (i.e., closed configuration) and the second position (i.e., open configuration), the first case portion 210 can include two longitudinal grooves 219 running from the bottom side surface 213 toward the top side surface 212 of the first case portion 210. The second case portion 230 can have complementary longitudinal rails 234 extending along the sides of the second case portion 230 that engage with the grooves 219. The first case portion 210 and/or the second case portion 230 can include a limiting mechanism to limit how far the second case portion 230 can move relative to the first portion 210. For example, the first case portion 210 can include a central longitudinal opening 220 and the second case portion 230 can include a protrusion 236 that is configured to slide within the central longitudinal opening 220.

Additionally or alternatively, the second case portion 230 can include a slider well 238 configured and sized to contain a slider mechanism 251. In some instances, the slider mechanism 251 can be spring-biased. In other instances, the slider mechanism 251 will not be spring-biased. The second case portion 230 can include a first roller coupling 231 and a second roller coupling 233. The first roller coupling 231 and the second roller coupling 233 are configured to rotate. The first case portion 210 can include a first fixed coupling 221 and a second fixed coupling 222. A slider mechanism 251 includes a first slider connector 252 and a second slider connector 253. The first slider connector 252 has a first end 254 and a second end 255. The second slider connector 253 has a first end 256 and a second end 257. The first ends 254, 256 and the second ends 255, 257 can have a loop shape for engagement with the roller couplings 231, 233 and/or the fixed couplings 221, 222. The first end 254 of the first slider connector 252 and the first end 256 of the second slider connector 253 are rotatably coupled to the first roller coupling 231 and the second roller coupling 233, respectively. The second end 255 of the first slider connector 252 and the second end 257 of the second slider connector 253 are rotatably coupled to the first fixed coupling 221 and the second fixed coupling 222, respectively. Alternatively, all of the couplings (including the first roller coupling 231 and the second roller coupling 233) can be fixed couplings around which the ends 254, 255, 256, 257 of the slider mechanism 251 can rotate.

As the second case portion 230 is slid relative to the first case portion 210, the first slider connector 252 and the second slider connector 253 rotate from a position where the first ends 254, 256 are closer than the second ends 255, 257 to the top side surface 212 of the external case 202, as shown in FIG. 2, to a position where the first ends 254, 256 are closer than the second ends 255, 257 to the bottom side surface 213 of the external case 202, as shown in FIG. 3. When the first slider connector 252 and the second slider connector 253 have pivoted into the position of FIG. 3, the second case portion 230 is prevented from sliding farther away from the first case portion 210. While the rotation of the first slider connector 252 and the second slider connector 253 is shown as being about a 90° pivot, the first slider connector 252 and the second slider connector 253 can be configured to rotate through any suitable angle or distance.

Figure 6:
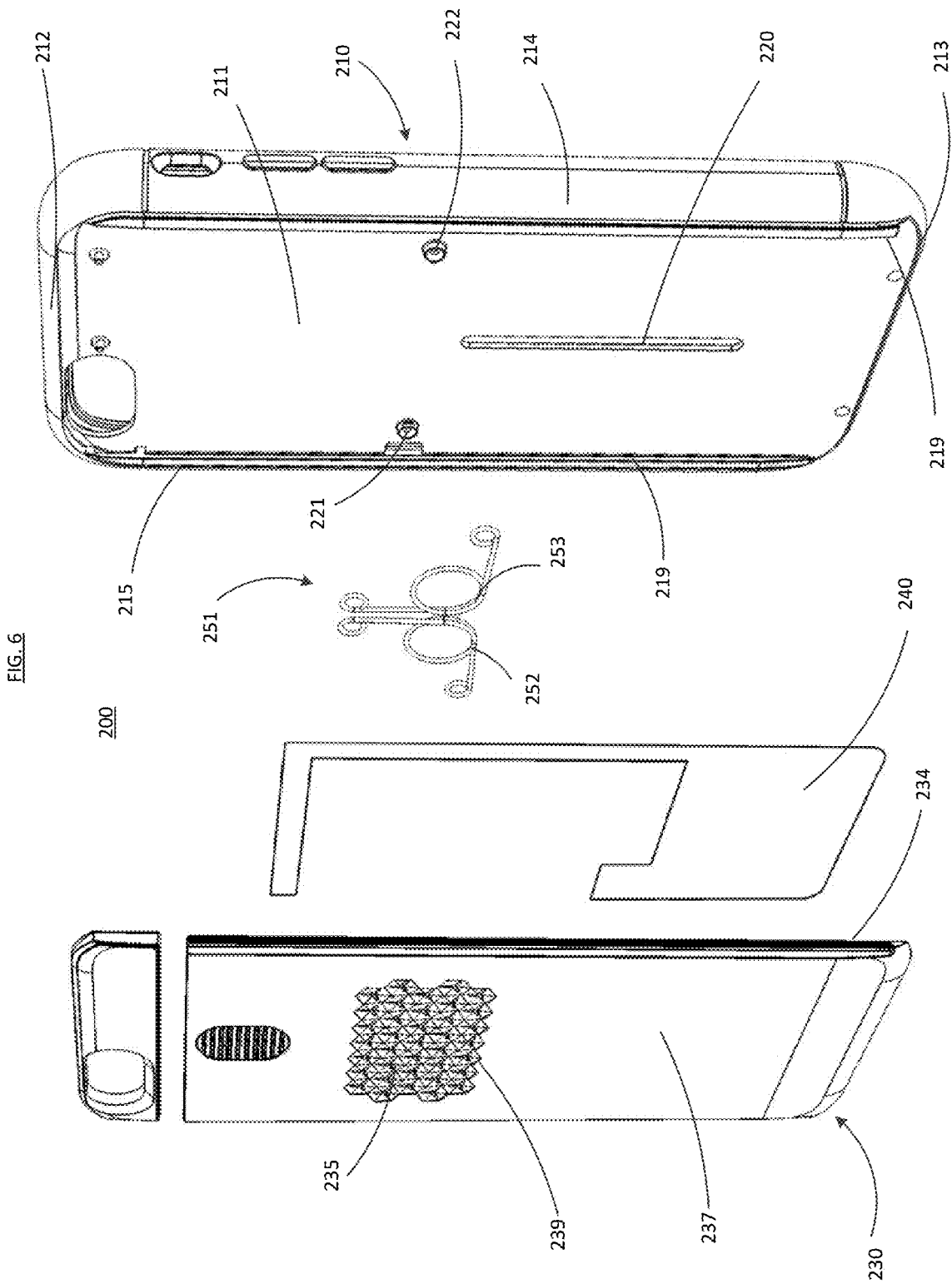
FIG. 6 is an exploded back perspective view of the external case of FIG. 2 with an opaque back exterior face.

FIG. 6 is an exploded perspective view of the apparatus 200 shown from a back left side with the second case portion 230 having an opaque back exterior face 237. As seen in FIG. 6, the slider well 238 can include a patterned surface 235 that can include cut-outs 261 (shown in FIG. 4) arranged in any configuration to provide an aesthetically-pleasing appearance of the external case 202. The back exterior face 237 can define a portion 239 for viewing of the patterned surface 235 of the second case portion 230.

The antenna system 240 can be similar to the antenna system 140 discussed above. For example, the antenna system 240 can be configured to be parasitically coupled to an antenna of a wireless device. When the external case 202 is attached to the wireless device and the wireless device is operational, the antenna system 240 is configured to receive from and send to free space. The antenna system 240 is configured to receive from and send to free space when the second case portion 230 is in the first position, shown in FIG. 2A, and in the second position, shown in FIG. 2B. In either the first position or the second position, the antenna system 240 can redirect radiation to free space and away from a user of the wireless device, such that a specific absorption rate (SAR) of the wireless device is reduced without substantially adversely affecting a total radiated power (TRP) of the wireless device.

As shown in FIGS. 2-6, the antenna system 240 of the second case portion 230 can be devoid of an active connection to the antenna of the wireless device. The antenna system 240 can be disposed entirely within the second case portion 230. Additionally, the antenna system 240 can have any suitable number of elements arranged in any suitable configuration to relatively optimize the TRP while relatively minimizing the SAR. For example, the antenna system 240 can be configured so that when the second case portion 230 is in either the first position or the second position, the antenna system 240 redirects enough radiation so that the SAR is reduced, but not so much radiation that the TRP is reduced to the extent that the wireless device boosts power to the antenna in order to increase the signal transmission and/or reception strength of the wireless device. In particular, in either the first or second positions of the second case portion 230, the antenna system 240 can be operated so that the TRP is not reduced to the extent that the wireless device boosts power to the antenna that results in the SAR being higher than if the external case 202 was not attached to the wireless device. The antenna system 240 can be configured to be optimized for a specific antenna within the wireless device. For example, the antenna system 240 can include a planar conductive loop and/or a series of planar bars. As another example, some smartphones (e.g., iPhone®, BlackBerry®, etc.) have an antenna located at both the upper and lower parts of the smartphone in a manner that borders the display area. The antenna system 240 can be configured to complement the antenna structure of that type of smartphone to relatively optimize the TRP while relatively minimizing the SAR.

Figure 7:
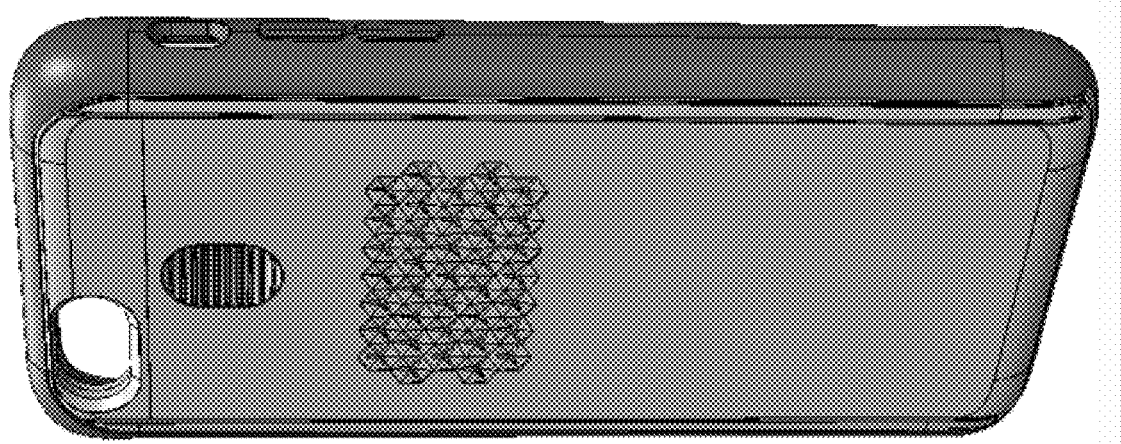
FIG. 7 is a perspective view of the external case of FIG. 2 in a closed configuration.
Figure 8:
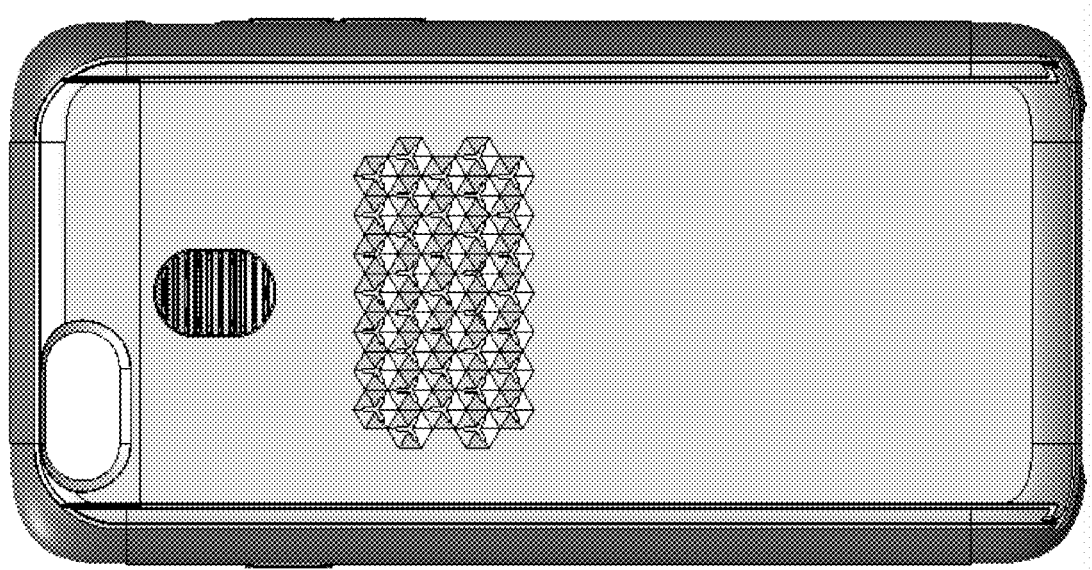
FIG. 8 is a back view of the external case of FIG. 2 in a closed configuration.
Figure 9:
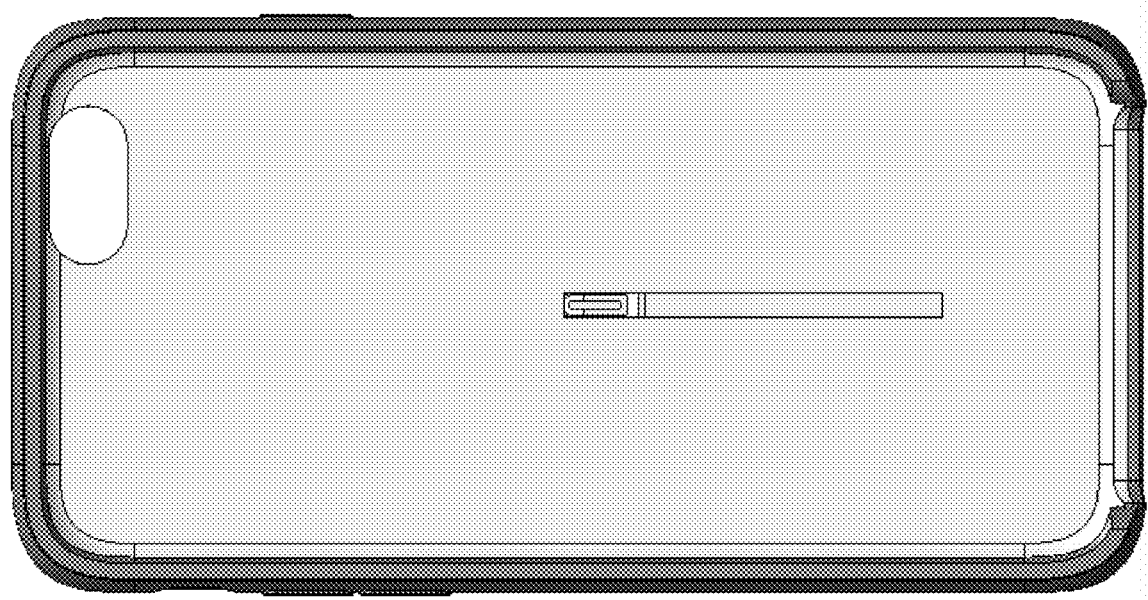
FIG. 9 is a front view of the external case of FIG. 2 in a closed configuration.
Figure 10:
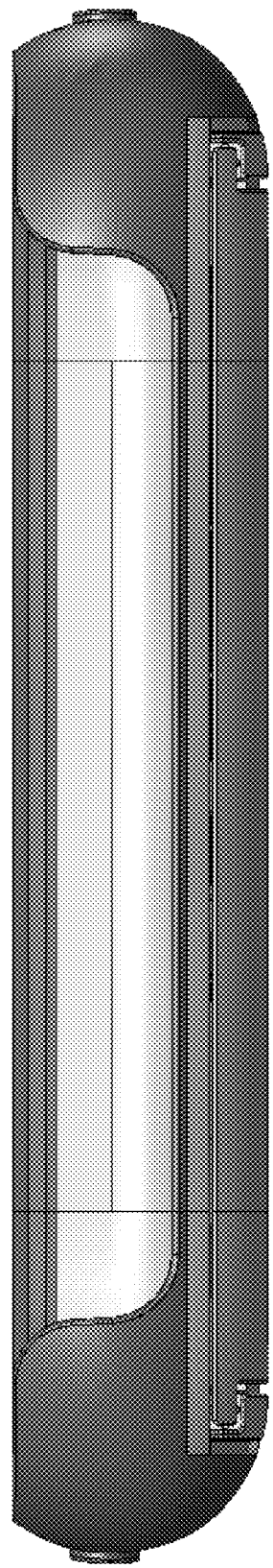
FIG. 10 is a bottom view of the external case of FIG. 2 in a closed configuration.
Figure 11:
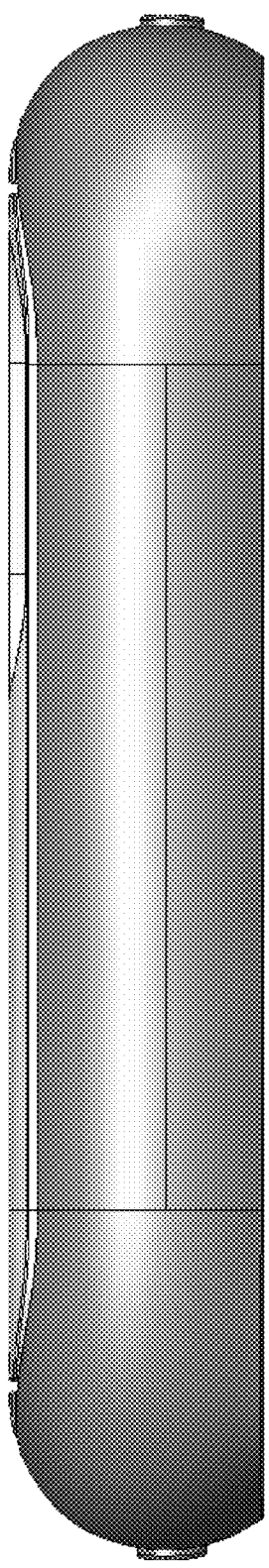
FIG. 11 is a top view of the external case of FIG. 2 in a closed configuration.
Figure 12:
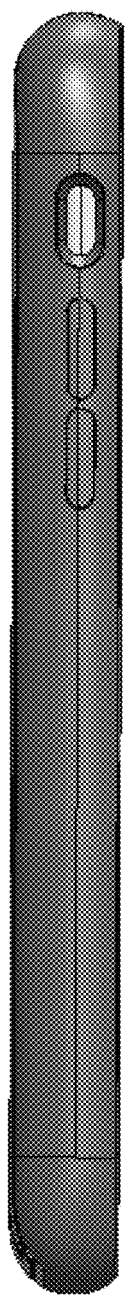
FIG. 12 is a left side view of the external case of FIG. 2 in a closed configuration.
Figure 13:
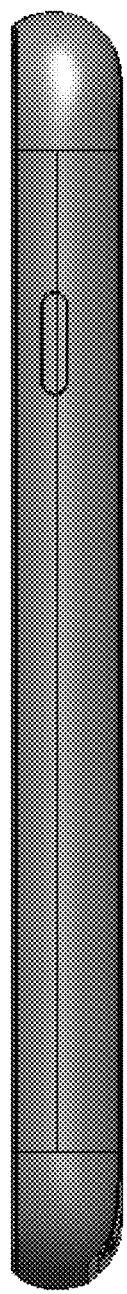
FIG. 13 is a right side view of the external case of FIG. 2 in a closed configuration.

FIGS. 7-20 show various views of the apparatus 200 in the first position (i.e., closed configuration) and the second position (i.e., open configuration). FIG. 7 is a perspective view of the apparatus 200 in the closed configuration. FIG. 8 is a back view of the apparatus 200 in the closed configuration. FIG. 9 is a front view of the apparatus 200 in the closed configuration. FIG. 10 is a bottom view of the apparatus 200 in the closed configuration. FIG. 11 is a top view of the apparatus 200 in the closed configuration. FIG. 12 is a left side view of the apparatus 200 in the closed configuration. FIG. 13 is a right side view of the apparatus 200 in the closed configuration.

Figure 14:
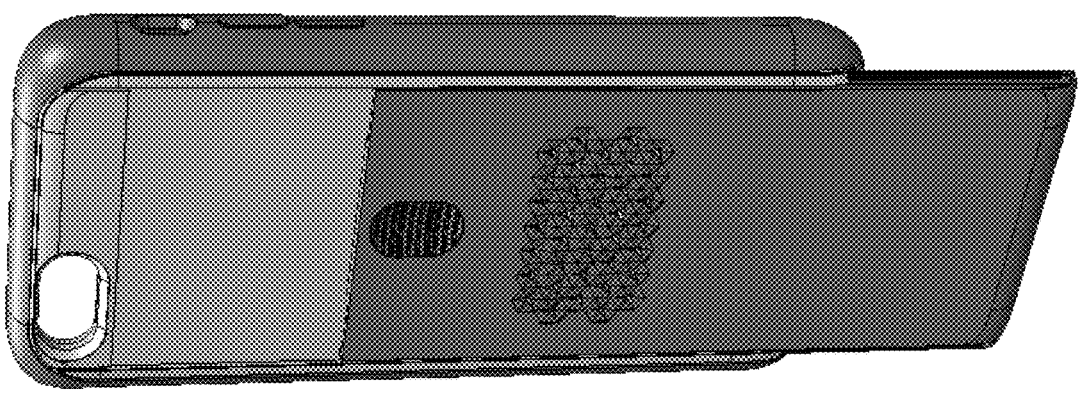
FIG. 14 is a perspective view of the external case of FIG. 2 in an open configuration.
Figure 15:
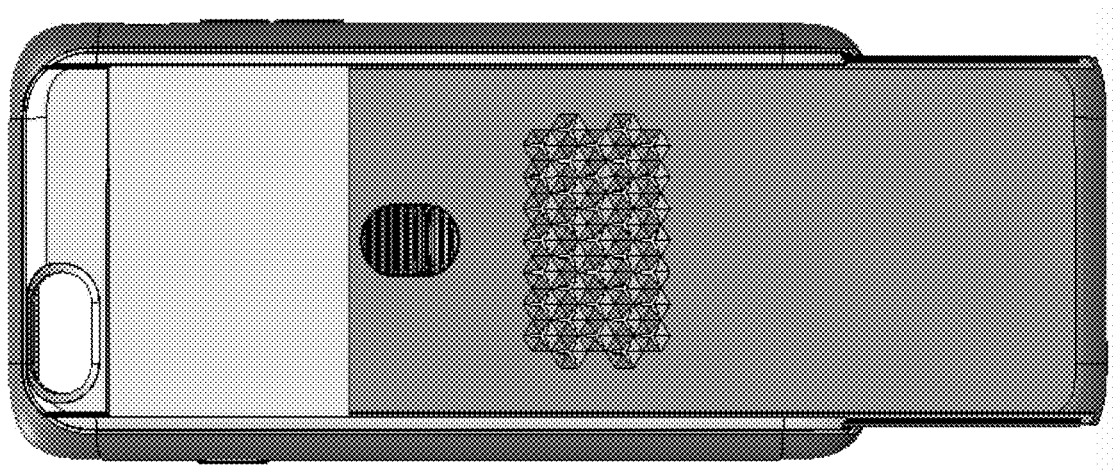
FIG. 15 is a back view of the external case of FIG. 2 in an open configuration.
Figure 16:
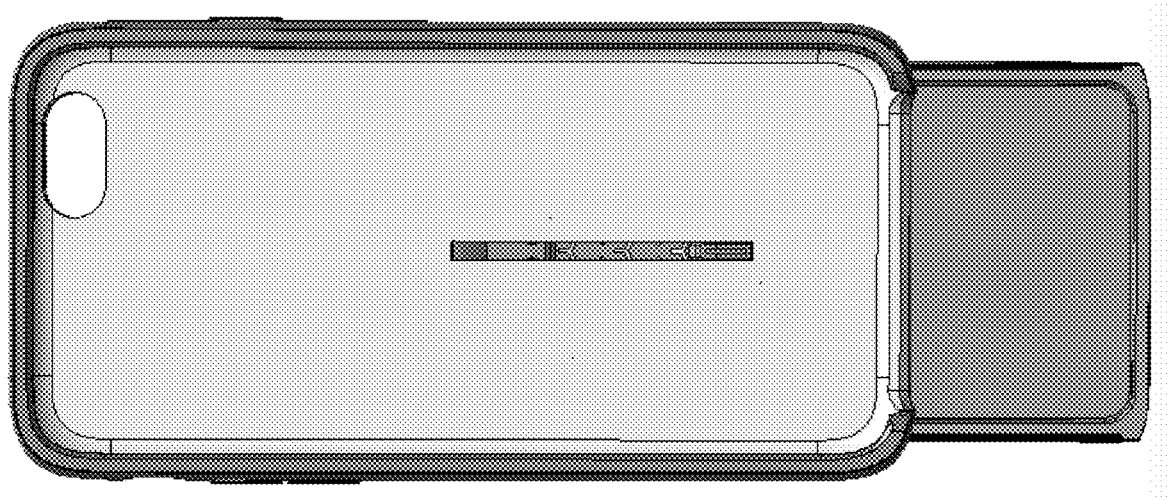
FIG. 16 is a front view of the external case of FIG. 2 in an open configuration.
Figure 17:
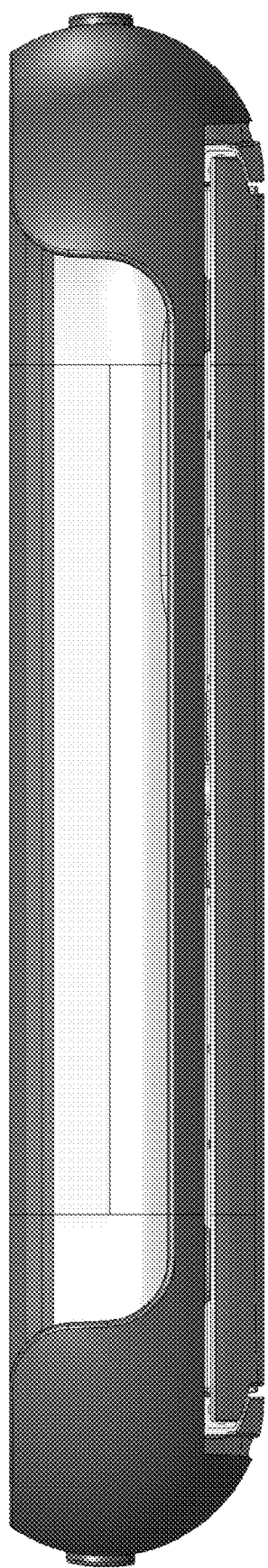
FIG. 17 is a bottom view of the external case of FIG. 2 in an open configuration.
Figure 18:
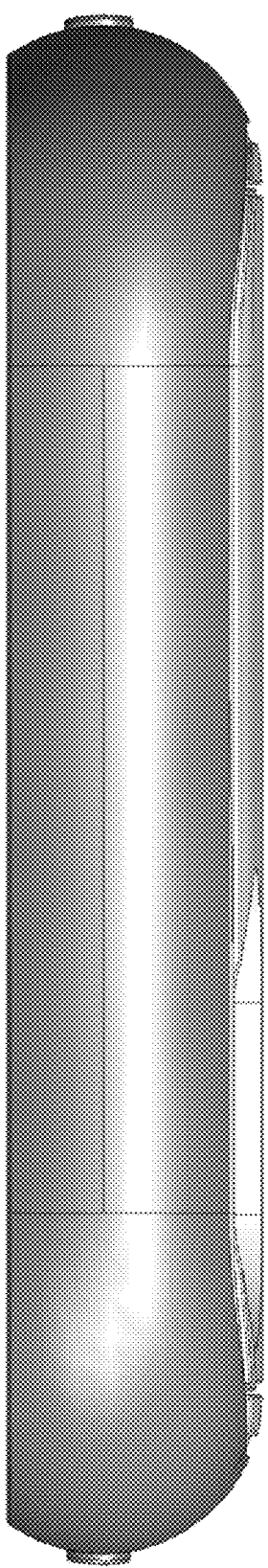
FIG. 18 is a top view of the external case of FIG. 2 in an open configuration.
Figure 19:
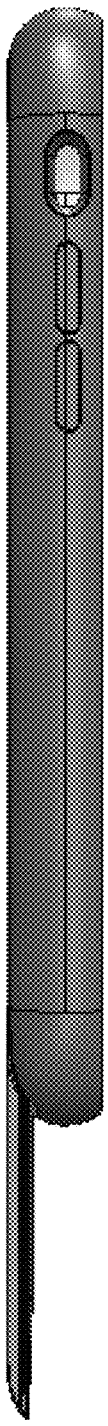
FIG. 19 is a left side view of the external case of FIG. 2 in an open configuration.
Figure 20:
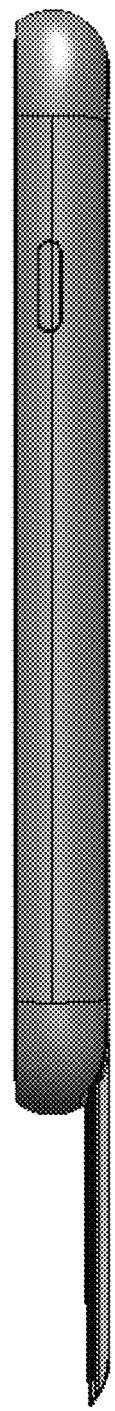
FIG. 20 is a right side view of the external case of FIG. 2 in an open configuration.

FIG. 14 is a perspective view of the apparatus 200 in the open configuration. FIG. 15 is a back view of the apparatus 200 in the open configuration. FIG. 16 is a front view of the apparatus 200 in the open configuration. FIG. 17 is a bottom view of the apparatus 200 in the open configuration. FIG. 18 is a top view of the apparatus 200 in the open configuration. FIG. 19 is a left side view of the apparatus 200 in the open configuration. FIG. 20 is a right side view of the apparatus 200 in the open configuration.

FIGS. 21A-21C are schematic illustrations of an apparatus 300 in three different operating positions, according to another embodiment. The apparatus 300 includes an external case 302. The external case 302 includes a first case portion 310 and a second case portion 330. The second case portion 330 is movably attached to the first case portion 310 and can be flexible. The second case portion 330 includes an antenna system 340. Although the antenna system 340 is shown as being disposed through most of the length of the second case portion 330, the antenna system 340 can be any suitable shape or size and can be disposed in any portion of the second case portion 330. The antenna system 340 can include, for example, a strip of metal that changes its shape as the second case portion 330 changes its position. The antenna system 340 can be devoid of an active connection to an antenna of a wireless device and can be disposed entirely within the second case portion 330. Additionally, the antenna system 340 can include any of the features described with respect to the antenna system 140 above and will not be further described herein.

The first case portion 310 is configured to attach to a wireless device (not shown). The wireless device can have an antenna and a case separate from the external case 302. The first case portion 310 can include a first connector 312 and a second connector 314. The second case portion 330 can include a first end 332 and a second end 334. The first end 332 can be fixedly coupled to a portion of the first case portion 310. The second end 334 can be movable relative to the first end 332. The second end 334 can be configured to be removably coupled to the first connector 312 and/or the second connector 314.

As shown in FIG. 21A, the second case portion 330 can be configured in a first operative position where the second end 334 of the second case portion 330 is disconnected from the first connector 312, and the second connector 314 is freely suspended from the first case portion 310. In this configuration, the second case portion 330 can be formed in any suitable shape, such as a substantially straight elongated flap or as an elongated coil. As shown in FIG. 21B, the second case portion 330 can be moved (e.g., rotated counterclockwise with respect to the arrangement shown in FIG. 21B) into a second operative position where the second end 334 of the second case portion 330 is coupled to the second connector 314. As shown in FIG. 21C, the second case portion 330 can be moved (e.g., rotated clockwise with respect to the arrangement shown in FIG. 21C) into a third operative position where the second end 334 of the second case portion 330 is coupled to the first connector 312. As shown in FIGS. 21A-21C, the second case portion 330 can have a first shape in a first position (i.e., the configuration of FIG. 21A), a second shape in a second position (i.e., the configuration of FIG. 21B), and a third shape in a third position (i.e., the configuration of FIG. 21C).

In each of the configurations of FIGS. 21A-21C, the antenna system 340 is configured to be moved between the various shapes and/or positions while the apparatus 300 continues to operate. The antenna system 340 can have different radiation redirecting and/or other characteristics depending on the shape and/or position of the second case portion 330. In some second case portion 330 shapes and/or positions, when the external case 302 is attached to a wireless device, the antenna system 340 can be configured to redirect more radiation to free space and away from the user of the wireless device than in other second case portion 330 positions. Said another way, the different shapes of the second case portion 330 shown in FIGS. 21A-21C can each have different SARs. The antenna system 340, however, can be configured to achieve a relative maximum performance at each likely shape and/or position of the second case portion 330.

Although the apparatus 300 is shown as having a first connector 312 and a second connector 314, the apparatus 300 can have any suitable number of connectors configured to be coupled with the second case portion 330. For example, the apparatus 300 could have only one connector, or three or more connectors. Additionally, the second case portion 330 can include a connector spaced from the second end of the second case portion 330 for attachment of the second end in a loop configuration.

FIGS. 22A-22C are schematic illustrations of an apparatus 400 in three different operating positions, according to yet another embodiment. The apparatus 400 includes an external case 402. The external case 402 includes a first case portion 410 and a second case portion 430. The first case portion is configured to attach to a wireless device (not shown). The wireless device can include an antenna and a case separate from the external case 402. The second case portion 430 is movably attached to the first case portion 410 via a hinge 450.

The second case portion 430 includes an antenna system 440. The antenna system 440 can be similar to the antenna system 140, 240, and 340 discussed above. For example, the antenna system 440 can be devoid of an active connection to an antenna of the wireless device and can be disposed entirely within the second case portion 430. Additionally, the antenna system 440 can include any of the features described with respect to the antenna system 140 above and will not be further described herein.

As shown in FIG. 22A, the apparatus 400 can be disposed in an operative position where the second case portion 430 extends substantially straight down from the first case portion 410. In other words, the second case portion 430 can be arranged 180° from the first case portion 410. As shown in FIG. 22B, the apparatus 400 can be disposed in a second operative position where the second case portion 430 is rotated via the hinge 450 approximately 90° to one side of the first case portion 410. As shown in FIG. 22C, the apparatus 400 can be moved into a third operative position where the second case portion 430 is rotated via the hinge 450 approximately 270° to the opposite side of the first case portion 410 as in FIG. 22B. Although not shown, the second case portion 430 can be shaped as a flap that can fold into a closed position in which the second case portion 430 is in contact with the first case portion 410. For example, the second case portion 430 can be configured to be folded closed for transport and then opened for use. Additionally, although the second case portion 430 is shown in approximately 90°, 180°, and 270° positions, the second case portion 430 can be rotated into any suitable orientation relative to the first case portion 410.

In each of the configurations of FIGS. 22A-22C, the antenna system 440 is configured to be moved between the various positions while the apparatus 400 continues to operate. The antenna system 440 can have different radiation redirecting and/or other characteristics depending on the rotational position of the second case portion 430 relative to the first case portion 410. In some second case portion 430 positions, when the external case 402 is attached to a wireless device, the antenna system 440 can be configured to redirect more radiation to free space and away from the user of the wireless device than in other second case portion 430 positions. Said another way, the different positions of the second case portion 430 shown in FIGS. 22A-22C can each have different SARs. However, the antenna system 440 can be configured to achieve a relative maximum performance at each likely shape and/or position of the second case portion 430.

While various embodiments have been described above, it should be understood that they have been presented in a way of example only, and not limitation. Where schematics and/or embodiments described above indicate certain components arranged in certain orientations or positions, the arrangement of components may be modified. While the embodiments have been particularly shown and described, it will be understood that various changes in form and details may be made.

Although various embodiments have been described as having particular features and/or combinations of components, other embodiments are possible having a combination of any features and/or components form any of the embodiments as discussed above.

The invention claimed is:

1. An external case for a mobile communication device, comprising:
   a first housing and a second housing slidably attached to the first housing, wherein the second housing is geometrically smaller than the first housing;
   the first housing including a back wall having a first surface and a second surface positioned opposite the first surface and a plurality of side surfaces extending away from the first surface of the back wall, the first surface and the plurality of side surfaces sized to secure the mobile communication device in a fixed position relative to the external case;
   the second housing slidably coupled with the first housing adjacent to the second surface of the back wall, the second housing being slidable between a retracted position and an extended position, the second housing including a single planar antenna element;
   the single planar antenna element of the second housing being configured to communicate wireless signals with an antenna of the mobile communication device and communicate wireless signals with free space when the external case is attached to the mobile communication device and when the mobile communication device is operational, the single planar antenna element being parasitically coupled to the antenna of the mobile communication device when the second housing is in the retracted position and when the second housing is in the extended position; and
   wherein the single planar antenna element redirects radiation to the free space and away from a hand of a user of the mobile communication device when the mobile communication device is operational, such that a transmission and/or reception strength associated with the mobile communication device when the external case is attached is stronger than a transmission and/or reception strength associated with the mobile communication device when the external case is not attached to the mobile communication device held in the hand of the user.

2. The external case of claim 1, wherein:
   the single planar antenna element is positioned to parasitically couple to the antenna of the mobile communication device when the external case is attached to the mobile communication device and when the mobile communication device is operational.

3. The external case of claim 1, wherein:
   the single planar antenna element is parasitically coupled to the antenna of the mobile communication device and is dimensioned to communicate wireless signals of cell phone frequencies with the free space, when the mobile communication device is operational and when the external case is attached to the mobile communication device.

4. The external case of claim 1, wherein:
   the single planar antenna element includes a first antenna element and a second antenna element,
   the first antenna element is parasitically coupled to the antenna of the mobile communication device, when the external case is attached to the mobile communication device and when the mobile communication device is operational,
   the first antenna element and the second antenna element are operatively coupled when the mobile communication device is operational,
   the second antenna element communicates wireless signals with the free space when the mobile communication device is operational.

5. The external case of claim 1, wherein the single planar antenna element of the second housing is devoid of a conductive connection with the antenna of the mobile communication device.

6. The external case of claim 1, wherein:
   the single planar antenna element redirects radiation to the free space and away from the user of the mobile communication device when the mobile communication device is operational, such that a specific absorption rate (SAR) of the mobile communication device is reduced without adversely affecting a total radiated power (TRP) of the mobile communication device.

7. The external case of claim 1, wherein:
   the single planar antenna element redistributes an RF near-field of the mobile communication device when the mobile communication device is operational, such that a specific absorption rate (SAR) of the mobile communication device is reduced without adversely affecting a total radiated power (TRP) of the mobile communication device.

8. The external case of claim 1, wherein the second housing has a shape when in the retracted position, the second housing has a shape when in the extended position different from the shape when in the retracted position.

9. The external case of claim 1, wherein the single planar antenna element is entirely disposed within the second housing.

10. An external case for a mobile communication device, comprising:
    a first housing and a second housing slidably attached to the first housing, wherein the second housing is geometrically smaller than the first housing;
    the second housing being slidable between a retracted position and an extended position, the second housing having a single planar antenna element and being devoid of a conductive connection to an antenna of the mobile communication device;

the single planar antenna element of the second housing being parasitically coupled to the antenna of the mobile communication device when the second housing is in the retracted positions;

the single planar antenna element of the second housing being parasitically coupled to the antenna of the mobile communication device when the second housing is in the extended position; and the single planar antenna element being configured to communicate wireless signals with the antenna of the mobile communication device and communicate wireless signals with free space when the external case is attached to the mobile communication device and when the mobile communication device is operational;

and wherein the single planar antenna element redirects radiation to the free space and away from a hand of a user of the mobile communication device when the mobile communication device is operational, such that a transmission and/or reception strength associated with the mobile communication device when the external case is attached is stronger than a transmission and/or reception strength associated with the mobile communication device when the external case is not attached to the mobile communication device held in the hand of the user.

11. The external case of claim 10, wherein:
the single planar antenna element of the second housing is disposed a first distance from the antenna of the mobile communication device when the second housing is in the retracted position, and disposed a second distance from the antenna of the mobile communication device different from the first distance when the second housing is in the extended position.

12. The external case of claim 10, wherein:
the single planar antenna element of the second housing is disposed at a first location relative to the antenna of the mobile communication device when the second housing is in the retracted position, and disposed at a second location relative to the antenna of the mobile communication device different from the first location when the second housing is in the extended position.

13. The external case of claim 10, wherein the second housing has a shape when in the retracted position, and the second housing has a shape when in the extended position different from the shape when in the retracted position.

14. An external case for a mobile communication device, comprising:
a first housing and a second housing slidably attached to the first housing, wherein the second housing is geometrically smaller than the first housing;

the second housing being slidable between a first position and a second position, the second housing having a surface and a single planar antenna element, the single planar antenna element being entirely disposed between the surface of the second housing and an outer surface of the mobile communication device;

the single planar antenna element of the second housing disposed a first distance from an antenna of the mobile communication device when the second housing is in the first position, and disposed a second distance from the antenna of the mobile communication device different from the first distance when the second housing is in the second position;

the single planar antenna element of the second housing being parasitically coupled to the antenna of the mobile communication device and configured to communicate wireless signals with free space when the external case is attached to the mobile communication device, when the mobile communication device is operational, and when the second housing is in the first position or the second position; and wherein the single planar antenna element redirects radiation to the free space and away from a hand of a user of the mobile communication device when the mobile communication device is operational, such that a transmission and/or reception strength associated with the mobile communication device when the external case is attached is stronger than a transmission and/or reception strength associated with the mobile communication device when the external case is not attached to the mobile communication device held in the hand of the user.

15. The external case of claim 14, wherein:
the external case being closed when the second housing is in the first position, the external case based open when the second housing is in the second position.

16. The external case of claim 14, wherein:
the first housing includes a back surface and four side surfaces to collectively define an interior volume, at least a portion of the mobile communication device being disposed within the interior volume when the mobile communication device is attached to the external case.

17. The external case of claim 14, wherein:
the single planar antenna element is a first passive antenna element, and the second housing has a second antenna element, the second antenna element receives signals from and sends signals to the free space when the external case is attached to the mobile communication device and when the mobile communication device is operational, such that a specific absorption rate (SAR) of the mobile communication device while the second housing is in the first position and an SAR of the mobile communication device while the second housing is in the second position are both less than an SAR of the mobile communication device when the external case is not attached to the mobile communication device.

18. The external case of claim 14, wherein:
a total radiated power (TRP) of the mobile communication device when the external case is attached to the mobile communication device, when the second housing is in the first position, and when the mobile communication device is operational, is not substantially reduced from a TRP of the mobile communication device when the external case is not attached to the mobile communication device; and a total radiated power (TRP) of the mobile communication device when the external case is attached to the mobile communication device, when the second housing is in the second position, and when the mobile communication device is operational, is increased from the TRP of the mobile communication device when the external case is not attached to the mobile communication device.

19. The external case of claim 14, wherein:
a total radiated power (TRP) of the mobile communication device when the external case is attached to the mobile communication device, when the second housing is in the first position, and when the mobile communication device is operational, is increased from a TRP of the mobile communication device when the external case is not attached to the mobile communication device; and a total radiated power (TRP) of the mobile communication device when the external case is attached to the mobile communication device, when the second housing is in the second position, and when the mobile communication device is operational, is increased from the TRP of the mobile communication device when the external case is in the first position.

20. The external case of claim 14, wherein:

a total isotropic sensitivity (TIS) of the mobile communication device when the external case is attached to the mobile communication device, when the second housing is in the first position, and when the mobile communication device is operational, is not substantially degraded from a TIS of the mobile communication device when the external case is not attached to the mobile communication device; and a total isotropic sensitivity (TIS) of the mobile communication device when the external case is attached to the mobile communication device, when the second housing is in the second position, and when the mobile communication device is operational, is improved from the TIS of the mobile communication device when the external case is not attached to the mobile communication device.

21. The external case of claim 14, wherein:

a received signal power of the mobile communication device when the external case is attached to the mobile communication device, when the second housing is in the first position, and when the mobile communication device is operational, is not substantially degraded from a received signal power of the mobile communication device when the external case is not attached to the mobile communication device; and the received signal power of the mobile communication device when the external case is attached to the mobile communication device, when the second housing is in the second position, and when the mobile communication device is operational, is improved from the received signal power of the mobile communication device when the external case is not attached to the mobile communication device.

22. The external case of claim 14, wherein:

the single planar antenna element of the second housing is parasitically coupled to the antenna of the mobile communication device when the mobile communication device is operational such that signals are communicated with the free space by the antenna of the mobile communication device via the single planar antenna element.

* * * * *